United States Patent [19]

Bowden

[11] Patent Number: 4,574,088

[45] Date of Patent: Mar. 4, 1986

[54] METHOD FOR PRODUCING MULTIPLE FOOD TURNOVERS

[76] Inventor: Arthur H. Bowden, 429 43rd Ave., San Francisco, Calif. 94121

[21] Appl. No.: 581,315

[22] Filed: Feb. 17, 1984

[51] Int. Cl.[4] ............................................ A21D 13/08
[52] U.S. Cl. .................................... 426/275; 249/121; 425/310; 426/280; 426/283
[58] Field of Search ............... 249/134, 119, 121, 108; 425/296, 298, 310, 512; 426/92, 94, 275, 280, 282, 283; 428/131, 134, 135; 264/132; 99/400.1, 450.2, 450.4, 450.6

[56] References Cited

U.S. PATENT DOCUMENTS

| Re. 28,068 | 7/1974 | Lemelson | 264/132 |
|---|---|---|---|
| 2,590,221 | 3/1952 | Stevens | 425/512 |
| 2,595,734 | 5/1952 | Toulmin | 264/132 |
| 2,855,867 | 10/1958 | Zeitlin | 99/450.6 |
| 3,026,822 | 3/1962 | Gatti | 99/450.6 |
| 3,385,205 | 5/1968 | McCloud | 249/121 |
| 3,396,430 | 8/1968 | Westcott | 425/512 |
| 3,566,447 | 3/1971 | Ogden | 425/298 |
| 3,828,391 | 8/1974 | Sutton et al. | 428/134 |
| 4,446,982 | 5/1984 | Corse | 249/155 |
| 4,450,122 | 5/1984 | Gallina | 249/121 |

Primary Examiner—Jay H. Woo
Assistant Examiner—Timothy W. Heitbrink
Attorney, Agent, or Firm—David Pressman

[57] ABSTRACT

A device for producing multiple food turnovers, such as ravioli, pirozhki, and similar food products made from dough with filling, comprises a female die (10) with a plurality of cavities (14) for forming individual products, and a male die (24) with a plurality of protrusions (26) mating with said cavities (14) of the female die (10). The device is provided also with a shield (40) having openings (42) which are smaller in dimensions than the cavities (14). In operation, female die (10) is covered with a first sheet of dough, and then the dough is pressed into cavities (14) by means of protrusions (26) on the male die (24). The male die (24) is removed, the female die (10) is covered with the shield (40), and the filling is poured into the dough pockets of the female die (10) using the guide openings (42) of the shield. The female die with dough and filling is covered with the second sheet of dough, and the latter is covered with a baking tray (46). The assembly is then inverted, the female die (10) is removed, and the tray with the turnovers is ready for subsequent operations.

2 Claims, 15 Drawing Figures

FIG. 3
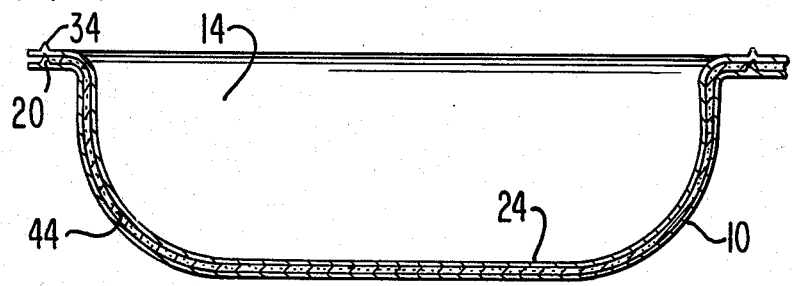
FIG. 4
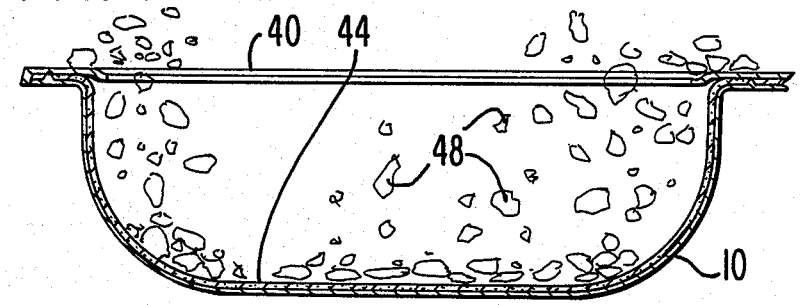
FIG. 5
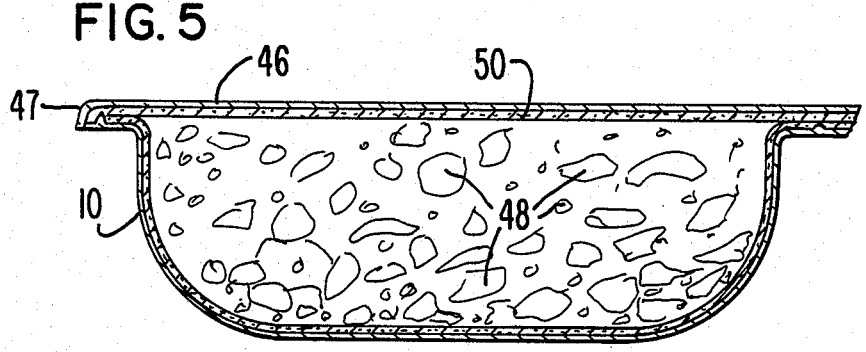
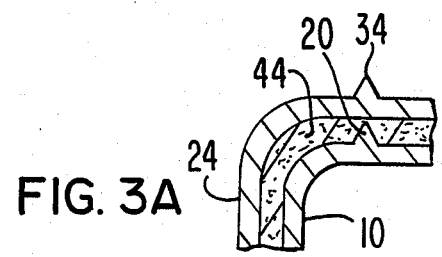
FIG. 3A

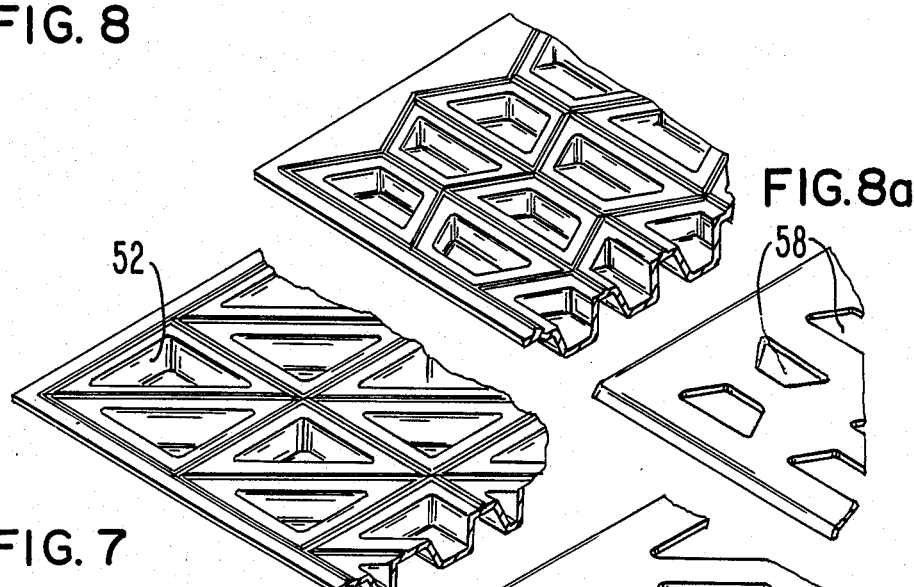
FIG. 8
FIG. 8a
FIG. 7
FIG. 7a
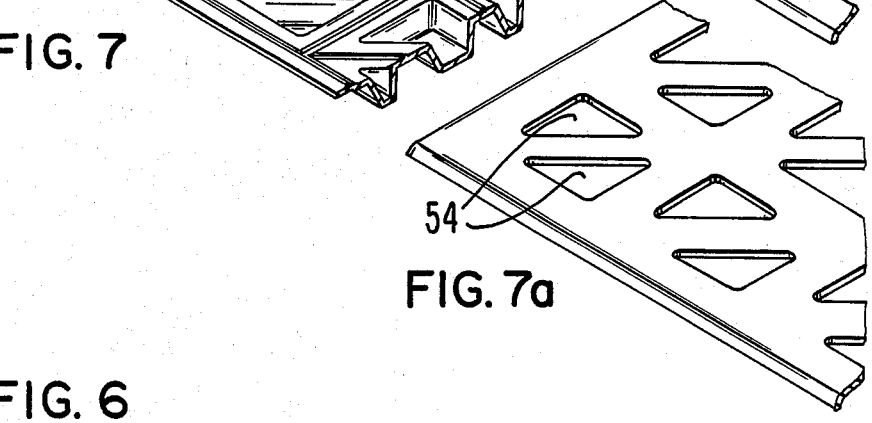
FIG. 6
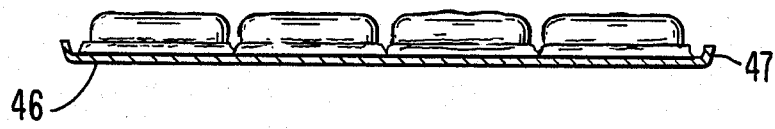

METHOD FOR PRODUCING MULTIPLE FOOD TURNOVERS

BACKGROUND—FIELD OF THE INVENTION

The present invention relates to the food industry, particularly to devices for producing food turnovers in batches in small shops, bakeries, restaurants, etc.

BACKGROUND—DESCRIPTION OF PRIOR ART

Heretofore attempts have been made to mechanize the process of making dough-covered fillings, such as turnovers, pirozhki, pasteries, ravioli, and similar products by using automatic machinery. One such automatic turnover machines, shown in U.S. Pat. No. 2,855,867 to S. Zeitlin, issued Oct. 14, 1958 was used to make pasteries from dough sheets and pastry filling; it comprised a continuous conveyor with a plurality of spaced foldable forming dies fixed to the conveyor. On their way along the conveyor, the unfolded dies were filled with dough and then food fillings from corresponding dispensing means. The dies were then folded closed to seal the dough and then they were opened in an unloading position for discharging the formed turnovers onto a receiving conveyor.

The automatic machines of the type described above were very complicated and expensive, and therefore they were not suitable for a small batch production, e.g., in small shops, restaurants, and bakeries. Furthermore, they only produced one turnover at a time and also produced excessive waste or trimmings. Although these wastes and trimmings could be reused, their quality was already affected by their previous use, resulting in a recovered product of inferior quality. Moreover, automatic machines, which had a plurality of moving parts, presented a hygienic problem and a problem of cleaning and maintenance.

Another device is known (U.S. Pat. No. 3,026,822 to J. Gatti, issued Mar. 27, 1962) which is suitable for use in small shops and bakeries. This device, which was intended for making filling-containing pastries such as ravioli or the like, comprised two pivotally connected plates, one of which was provided with a plurality of spaced holes. In use, the two plates were positioned on a support with adjacent side edges abutting and a sheet of dough was laid upon their upper surfaces. Small quantities of fillings were then placed onto the respective areas of the dough sheet which covered the holes and the non-apertured plate was turned over and laid onto the plate with holes, whereby the two sheets of dough adhered, sealing the fillings therebetween. The assembled plates were inverted, the two-layer dough sheet was trimmed by a knife, and the plates were opened for separating and removing the pastries.

This device, however, did not eliminate waste or trimmings, with their aforementioned disadvantages. Moreover, it did not guarantee uniform quality and required the work of a skilled operator, as each loading of the fillings required great attention and accuracy for proper positioning of the fillings onto the appropriate places of the dough sheet.

A step towards an improvement in the art was made by designing a ravioli plate which was manufactured and sold by Vitantonio Mfg. Co., Eastlake, OH 44094. This device was very similar to that described in the aforementioned Gatti patent. It comprised two plates, one with holes and another with recesses, the positions of which correspond to said holes. The protrusions formed on the back side of the plate due to said recesses were used in the production process as male dies. The apertured plate in this case, however, was provided with zig-zag shaped scoring edges along the holes, the function of which was to cut the superimposed sheets of dough.

The ravioli plates described above, nevertheless, entailed a number of serious disadvantages, as they did not eliminate the necessity of skilled labor and required the attention and accuracy in the step of loading the fillings into the respective food filling pockets. As a result of this, it was impossible to assure uniform quality and speedy production of the turnovers. Furthermore, the round shape of holes and recesses resulted in inefficient use of the dough sheet area and a low rate of filling of turnovers. The zig-zag shape of the cutting ridges presented difficulties in cleaning and required additional time.

OBJECTS AND ADVANTAGES OF THE PRESENT INVENTION

Accordingly several objects of the present invention are: to provide a simple and efficient device for producing multiple food turnovers in small shops, restaurants and bakeries, i.e., in small batch production; to improve the uniformity and quality of the finished product; to increase production speed; to eliminate necessity of using the skilled labor; to increase the useful area of the dough sheet and the rate of filling of turnovers; to provide economical production of turnovers and pastries; to improve versatility of the device and increase its utilization factor due to interchangeability of its parts; to make the filling operation independent of the size of filling chunks; to improve hygienic conditions of production and to simplify cleaning; and to create conditions for mechanization or automation of small-batch turnover production with very simple and inexpensive means. Further objects and advantages will become apparent from a consideration of the ensuring description and drawings.

BRIEF DESCRIPTION OF DRAWINGS

FIG. 3 is a schematic cross-sectional view of the male die, pressing the lower sheet of dough into the female die.

FIG. 3a is a view of portion A of FIG. 3 in a larger scale showing the position of dough over the scoring edges of the female die.

FIG. 4 is a view which shows pouring of food filling into the dough-lined cavity of the female die.

FIG. 5 is a view showing the food-filled female die covered by a second sheet of dough and a baking tray.

FIG. 6 is a view of a baking tray with turnovers after removing the female die.

FIG. 7 is a partial perspective view of a female die with a triangularly shaped die cavities.

FIG. 7a is a partial perspective view of a shield for the female die of FIG. 7.

FIG. 8 is a view similar to FIG. 7, illustrating a female die with a trapezoidal die cavities.

FIG. 8a is a partial perspective view of a shield for the female die of FIG. 8.

DESCRIPTION OF THE PREFERRED EMBODIMENT OF THE INVENTION

Figures 1A, 1B, 1C, 1D, 1E, 1F:
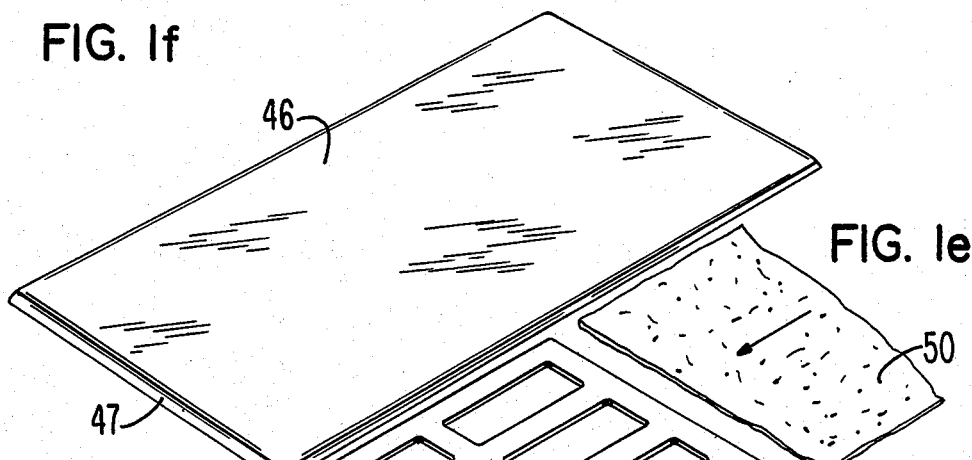
FIG. 1a is a perspective view of a female die of a device according to the present invention.
FIG. 1b is a partial perspective view of a first flat (lower) dough sheet.
FIG. 1c is a perspective view of a male die.
FIG. 1d is a perspective view of a shield.
FIG. 1e is a partial perspective view of a second flat (upper) dough sheet.
FIG. 1f is a partially broken perspective view of a baking tray.

FIGS. 1a–1e illustrate various parts of a device of the present invention for producing multiple food turnovers. The device comprises a female die 10 (FIG. 1a) which is a rectangular frame 12 made of a suitable metal or plastic material with a plurality of uniformly-spaced cavities 14 of any desirable shape. In the embodiment of FIGS. 1a–1f, the cavities have a rectangular shape and they are tapered downward at a certain angle. As compared to a round shape used in conventional devices for producing multiple food turnovers, the rectangular shape is advantageous in that it provides more efficient utilization of the surface of a dough sheet, as will become clearer from a further consideration of the invention.

Cavities 14 are separated by transverse and longitudinal mullions 16 and 18, respectively, which are provided with straight scoring ridges 20. The purpose of ridges 20 will be explained hereinafter with reference to the operation of the device.

Margins 21 are provided beyond the limits of peripheral mullions 18 on female die 10. Protrusions 22 on the back side of female die 10 correspond to the shape of cavities 14 and are formed automatically when female die 10 is stamped from metal or molded from plastic. Protrusions 22 taper downward.

FIG. 1c is a perspective view of a male die 24, which preferably is identical to the male die 10 with regard to its size and dimensions. It is provided with protrusions 26 which are formed on its back side when its cavities 28 are stamped from metal or molded in plastic material. The shapes and dimensions of protrusions 26 of male die 24 correspond to those of cavities 14 in female die 10. Cavities 28 of male die 24 are separated by longitudinal mullions 30 and transverse mullions 32 which are provided with scoring ridges 34.

Another important part of the device of the invention is a shield 40 which is shown in FIG. 1d. Its dimensions should be large enough to cover the upper surface of female die 10. Shield 40 is provided with openings 42 which have the same configurations as cavities 14 in their plan view, but preferably of a slightly smaller size, i.e., of the same size as the bottom area of each downward-tapered cavity 14, or even smaller. In the illustrated embodiment, openings 42 are of a rectangular shape which corresponds to the rectangular shapes of cavities 14.

FIG. 1f is a partially broken view of a baking tray 46. Tray 46 has a curved-up portion or lip 47 whose height from the bottom of the tray is larger than the height of scoring ridges 20 of female die 10. Tray 46 is dimensioned so that it can rest upon margin 21 of female die 10, beyond the outer limits of its peripheral mullion 18.

OPERATION OF THE DEVICE OF THE PRESENT INVENTION

Operation of the device of the present invention will be described further with reference to FIGS. 1b, 1e, 2, and 3 to 5.

Figure 2:
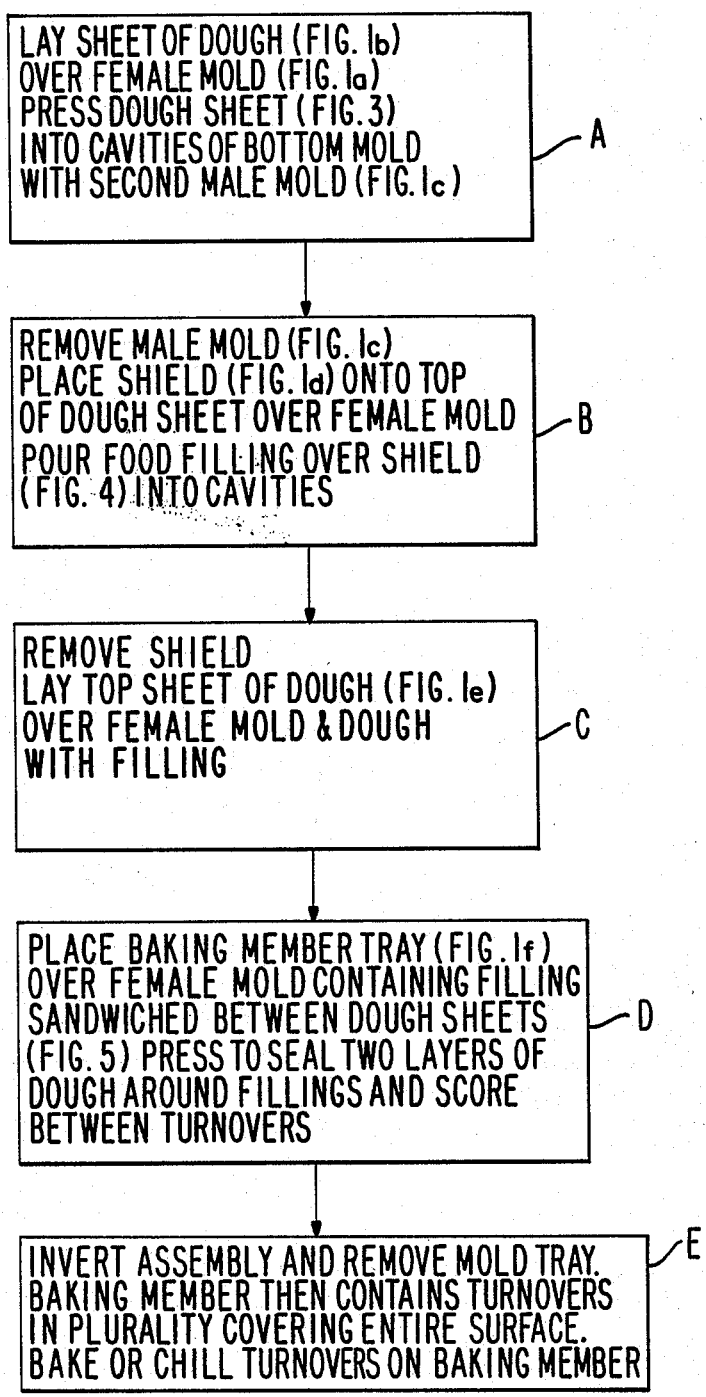
FIG. 2 is a flow chart of operations performed in connection with the use of the device of the present invention.

FIG. 2 is flow chart of sequential operations used in a batch production of multiple food turnovers by means of the device of the invention.

As indicated in FIG. 2, block A, first sheet of dough 44 (FIG. 1b), which is preliminarily rolled to the desired thickness, is placed over cavities 14 of female die 10 so that it completely covers these cavities. Preferably dough sheet 44 should have dimensions which exceed the overall dimensions of female die 10 to compensate for the dough area consumed when it is drawn into the cavities of female die 10. The thickness of dough sheet 44 should slightly exceed the height of scoring edges 20 in order to prevent complete cutting of the dough but rather permit weakening its cross section along pilot lines to facilitate serving it along such lines after baking, thereby to separate individual turnovers or groups of turnovers, as desired.

Male die 24 is then used to press dough sheet 44 into cavities 14 to their bottoms (FIG. 1c), whereby it assumes the position shown in FIGS. 3 and 3a.

As indicated in FIG. 2, block B, male die 24 is removed and shield 40 (FIG. 1d) is placed onto the top of dough sheet 44 and over female die 10, so that openings 42 of shield 40 are aligned with the openings of cavities 14 of female die 10. This arrangement of shield 40, which is shown in FIG. 4, is used when food filling 48 is poured into cavities 14 through openings 42 of shield 40. All cavities of female die 10 are filled simultaneously from any suitable dispensing means (not shown). This operation does not require any skill or attention, as openings 42 will allow food filling 48 to fall only into each cavity 14, and not onto the partitions or mullions between cavities.

As indicated in FIG. 2, block C, after filling the cavities, shield 40 is removed and a second sheet of dough 50 (FIG. 1e) is laid over female die 10 with its bottom laid upon dough 44 and filling 48. When shield 40 is removed, any particles of filling 48 which fell onto the webs 43 (FIG. 1d) of shield 40 will be removed with the shield. Thus there is no need to remove filling from the mullions of the female die, so that speed of fabrication is greatly increased and filling skill is not needed.

Next, as indicated in FIG. 2, block D, baking tray 46 is then placed over the second sheet of dough 50 onto female die 10 so that it rests upon peripheral margins 21. It is pressed down to seal the two layers of dough 44 and 50 around each filling. At this moment, the dough is squeezed and sealed between the mullions and baking tray 46, and it is also sealed and scored between baking tray 46 and scoring edges 20. Scoring edges 20 penetrate the dough, leaving a thin connecting portions between separated parts of the dough. This occurs because the height of scoring edges 20 is less than the height of tray lip 47 and the thickness of the two dough sheets. This is illustrated in FIG. 5.

As indicated in FIG. 2, block E, the assembly is inverted, and female die 10 is removed, leaving integrally interconnected turnovers on baking tray 46 ready for baking. After baking in an oven, or after refrigeration, the turnovers can be easily separated piece by piece or in required combinations by severing them along the lines of scoring.

As has been mentioned above, both the female and male dies are identical. Therefore when the male die is removed, it can be immediately reused in the production process as a female die. This feature greatly improves the efficiency of production and saves money and time. The straight-line configuration of scoring edges and the absence of other irregularities on the surface of dies facilitate cleaning of the device and improve hygienic conditions of its application.

It is obvious that many other modifications of the device for producing multiple food turnovers are possible. For example, the female and male dies and their shield may have triangular cavities 52 and openings 54, as shown in FIGS. 7 and 7a, respectively. Also they may have trapezoidal cavities 56 and openings 58, as shown in FIGS. 8 and 8a, respectively. Any other shapes of cavities are possible as required by particular turnovers produced in the device. Dies and shields can be made from any food-compatible metal or plastic material. The process is not affected by large filling chunks of fillings, whereas conventional devices are actually restricted by the sizes of the filling chunks, as well as by the firmness and texture of filling. Therefore the scope of the invention should be determined, not by the examples given, but by appended claims and their legal equivalents.

What I claim is:

1. A method of fabricating turnovers comprising:

providing a female die having a top surface and at least three concave food-receiving cavities extending down from said top surface, said cavities having an open top for receiving fillings and closed bottom and side portions for holding such fillings, the portions of said top surface between said open tops of said cavities constituting mullions which separate and surround said open tops, lining said cavities of said female die with a first layer of dough, providing a shield comprising a member having a two-dimensional array of through openings which correspond in their shapes and positions to said cavities of said female die, said through openings in said shield being separated by web portions which correspond in shape and size to said mullions on said die, placing said shield over said die so that the openings of said shield are in registration with the open tops of said cavities and so that the webs of said shield cover said mullions of said die, pouring food filling over said shield and said die until said cavities are filled to a predetermined degree and inaccurately enough so that portions of said filling fall onto the webs of said shield, removing said shield with said portions of said filling thereon, whereby upon removal of said shield, the mullions of said die will be left clear of filling so that fabrication speed of said turnovers will be enhanced, covering said female die after said cavities are lined with said layer of dough with a second layer of dough so that the filling in each of said cavities is surrounded with dough, placing a flat tray upon said second layer of dough, thereby forming an assembly, inverting said assembly and pressing said flat tray and said female mold together so as to seal said second layer of dough to said first layer of dough at the areas of said mullions, and removing said female die so as to leave formed turnovers on said flat tray.

2. The method of claim 1 further including providing a male mold having a plurality of protrusions thereon which are spaced and sized to mate with said cavities of said female die, and wherein said lining of said cavities of said female die with said layer of dough is accomplished by placing a layer of dough over said female die and pressing said layer of dough into said cavities with said male mold.

* * * * *